United States Patent
Schwarzbich (10) Patent No.: US 7,226,263 B2
(45) Date of Patent: Jun. 5, 2007

(54) DEVICE FOR CONNECTING COMPONENT PARTS, COMPRISING A BLIND RIVET FASTENER

(75) Inventor: Jörg Schwarzbich, Bielefeld (DE)

(73) Assignee: Bollhoff Verbindungstechnik GmbH, Bielefeld (DE)

( * ) Notice: Subject to any disclaimer, the term of this patent is extended or adjusted under 35 U.S.C. 154(b) by 55 days.

(21) Appl. No.: 10/926,480

(22) Filed: Aug. 26, 2004

(65) Prior Publication Data

US 2005/0047893 A1    Mar. 3, 2005

(30) Foreign Application Priority Data

Aug. 27, 2003 (DE) .......................... 203 13 241 U (51) Int. Cl.
F16B 43/02 (2006.01)
F16B 13/04 (2006.01)

(52) U.S. Cl. .................. 411/546; 411/34; 411/35; 411/38; 411/183; 403/374.3

(58) Field of Classification Search ................ 411/546, 411/34, 35–38, 183; 403/374.3
See application file for complete search history.

(56) References Cited

U.S. PATENT DOCUMENTS

| | | | |
|---|---|---|---|
| 2,277,885 A * | 3/1942 | Rodanet | 411/34 |
| 4,043,239 A * | 8/1977 | DeFusco | 411/337 |
| 4,074,608 A * | 2/1978 | Siebol | 411/43 |
| 4,682,906 A * | 7/1987 | Ruckert et al. | 403/409.1 |
| 5,051,048 A * | 9/1991 | Maddox | 411/34 |
| 5,288,191 A * | 2/1994 | Ruckert et al. | 411/432 |
| 5,340,258 A * | 8/1994 | Simon | 411/535 |
| 5,492,388 A * | 2/1996 | Kawasaki | 296/193.02 |
| 6,062,763 A * | 5/2000 | Sirois et al. | 403/329 |
| 6,135,690 A * | 10/2000 | Juling et al. | 411/353 |
| 6,357,953 B1* | 3/2002 | Ballantyne | 403/43 |
| 6,585,447 B2* | 7/2003 | Schwarzbich | 403/374.3 |
| 6,688,830 B2* | 2/2004 | Kluting | 411/546 |
| 6,776,566 B2* | 8/2004 | Kobusch et al. | 411/546 |
| 6,789,993 B2* | 9/2004 | Ozawa et al. | 411/546 |
| 6,860,686 B2* | 3/2005 | Schneider | 411/34 |
| 2005/0047893 A1* | 3/2005 | Schwarzbich | 411/546 |

FOREIGN PATENT DOCUMENTS

GB    2240603    * 8/1991

* cited by examiner

*Primary Examiner*—Katherine Mitchell
(74) *Attorney, Agent, or Firm*—Seyfarth Shaw LLP (57) ABSTRACT

A device for connecting component parts includes a blind rivet nut adapted to be anchored in one component part by a riveter which has a threaded stud; a spacer which is in threaded engagement with the blind rivet nut and, by being screwed-out, reaches a position in which it is supported at the other component part; a connecting screw adapted to be screwed into the blind rivet nut; and a torque transmitting intermediate member, which is accommodated in a receptacle of the spacer and transmits a torque onto the spacer when the connecting screw is screwed in. For anchoring the blind rivet nut in the one component part, the threaded stud is capable of being inserted into the intermediate member and the spacer and then being screwed into the blind rivet nut without causing the spacer to be rotated in its screw-out direction.

9 Claims, 6 Drawing Sheets

DEVICE FOR CONNECTING COMPONENT PARTS, COMPRISING A BLIND RIVET FASTENER

BACKGROUND OF THE INVENTION

The invention relates to a device for connecting component parts, comprising: a blind rivet nut adapted to be anchored in one of the components parts by means of a riveter having a threaded stud; a spacer held in threaded engagement with said blind rivet nut, said spacer being brought into a support position at the other-of said component parts by being screwed out of said blind rivet nut; a connecting screw adapted to be screwed into said blind rivet nut, and a torque-transmitting intermediate member that is accommodated in a receptacle of said spacer and transmits a torque onto the spacer when the connecting screw is screwed-in.

Devices of this type are known, which serve for connecting two component parts with a certain spacing relative to one another by means of a connecting screw, without the component parts being drawn together when the connecting screw is tightened. Conventionally, for establishing the connection, the blind rivet nut is at first inserted into one of the component parts and plastically deformed by exerting a tensile stress, so that it is anchored in the one component part. For deforming the blind rivet nut, a threaded stud of a riveter is screwed into the blind rivet nut, and the blind rivet nut is immobilized at its outer end and is jolted by withdrawing the threaded stud. Then, the spacer is inserted into the blind rivet nut and screw-tightened therewith. To this end, the blind rivet nut has, in addition to the regular thread of the nut, another thread which is a left-handed thread.

The connecting screw, the external thread of which has the same dimensions as the threaded stud, is then inserted through the other component part and the spacer and is screwed into the blind rivet nut. By the intermediate member provided in the spacer, the spacer is frictionally entrained when the connecting screw is rotated. Due to the left-handed thread between the spacer and the blind rivet nut, the spacer is thereby screwed out of the blind rivet nut and approaches the other component part, until it is finally supported at this component part.

In order to avoid that the spacer is screwed out already when the threaded stud of the riveter is screwed into the blind rivet nut, the spacer can only be screwed into the blind rivet nut after the latter has been riveted. The device is therefore supplied in two parts, namely the blind rivet nut ready to be inserted, and the spacer, which parts have to be assembled in the steps described above.

SUMMARY OF THE INVENTION

It is an object of the invention to provide a device of the type indicated above, which can be mounted more easily and efficiently.

According to the invention, this object is achieved by the feature that, for anchoring the blind rivet nut in the one component part, the threaded stud is capable of being inserted into the intermediate member and the spacer and then being screwed into the blind rivet nut without the spacer being rotated in its screw-out direction.

In a supply condition, the spacer is already screwed-in in the blind rivet nut. Then, the threaded stud of the riveter is inserted or screwed into the intermediate member and the spacer without rotating the spacer together therewith. By withdrawing the threaded stud, the blind rivet nut can be riveted to the first component part, as is known per-se. Since the spacer is in engagement with the blind rivet nut through a left-handed thread, the spacer is not rotated in its screw-out direction when the threaded stud is screwed-out, even though there may be a frictional connection between the spacer and the threaded stud via the intermediate member. Instead, the threaded stud can slide in the intermediate member.

It is a particular advantage that the spacer and the blind rivet nut can be supplied in a condition in which they are already screwed together. Thus, on behalf of the user, the mounting step of inserting and screwing-in the spacer into the blind rivet nut may be dispensed with. This substantially simplifies the mounting process and leads to considerable time and cost savings.

Useful embodiments of the invention are indicated in the dependent claims.

In a first embodiment, the threaded stud is adapted to be inserted with play into the intermediate member, which is in a non-active position, and into the spacer, before the blind rivet nut is anchored in the one component part, and the spacer has guide contours which transfer the intermediate member into its active position when the blind rivet nut is riveted.

Since the threaded stud can at first be inserted with play through the intermediate member in the non-active position, the blind rivet nut, with the spacer being screwed-in, may be inserted into the first component part and riveted in conventional way. During the screw-in movement which is necessary for this, the intermediate member does not participate in the rotation, because of the play, so that the spacer is not screwed out of the blind rivet nut. Only when, by drawing action, the blind rivet nut is jolted and riveted to the component part, the blind rivet nut simultaneously pushes the intermediate member along the guide contours into its active position.

When the threaded stud is screwed out of the blind rivet nut, the latter is rotated in counterclock sense, so that, with a left-handed thread between the blind rivet nut and the spacer, the spacer is still not screwed-out, even though the intermediate member is now in its active position and establishes a frictional connection between the threaded stud and the spacer.

Now, the connecting screw can be inserted through the other component part into the spacer and can be screwed into the blind rivet nut. In this condition, the connecting screw is frictionally connected with the spacer via the intermediate member and will drive the spacer to rotate together with the screwing movement and thereby ensure, in a manner known per-se, that the spacer is screwed out of the blind rivet nut and reaches a position where one end thereof is supported at the other component part. Thus, by further screwing-in the connecting screw, both component parts are tightened together with a predetermined spacing therebetween.

In particular, the intermediate member may be an elastic ring which is seated in the receptacle of the spacer and, when the blind rivet nut is riveted, is axially pressed into a cone which forms the guide contour. Thereby, the elastic ring can be narrowed. Preferably, the elastic ring is interrupted by a slot. The narrowing of the elastic ring is then made possible by a reduction of the width of the slot when the elastic ring is pressed into the cone of the receptacle.

In its active position, the intermediate member is preferably locked by snap-action against axial displacement in the spacer. The snap-action assures a defined position in the spacer. In particular, this prevents the intermediate member from being loosened or pushed out of its active position when the two component parts, once they have been connected, are disassembled and then the connecting screw is inserted once again.

Optionally, the intermediate member may also be formed by an O-ring made of rubber-elastic material, which is radially compressed when pushed into the guide contour and is then engaged, for example, in an annular groove in the internal surface of the spacer and is thereby secured in axial direction.

Preferably, the blind rivet nut forms a support surface for one end of the intermediate member. This has the advantage that, when the blind rivet nut has been riveted and then the connecting screw is inserted into the spacer, the intermediate member may be supported on the support surface. This efficiently prevents the intermediate member from being pushed out of the spacer, and this effect may additionally be assisted by the snap-mechanism mentioned above.

In a second embodiment, the threaded stud has a threaded portion and a shaft with reduced diameter, and the height of the threaded portion is so small, that the latter, before the blind rivet nut is riveted to the one component part, may be pushed through the intermediate member into a position in which it is accommodated in a height range between the intermediate member and the thread of the blind rivet nut. As a result, the spacer and the blind rivet nut may already be screwed together in the supply condition of the device, as in the first embodiment. The intermediate member may be in its active position from the outset, since no rotation occurs when the threaded stud is pushed through. When the threaded stud is screwed into the blind rivet nut, however, the threaded portion of the stud projects already so far out of the intermediate member that the latter is not rotated together with the stud. When the threaded stud is screwed out, the sense of rotation is such that the spacer is still not rotated together with the stud, as in the first embodiment, although the threaded stud may now be frictionally connected to the spacer. The intermediate member may again be formed by an elastic ring.

It is preferable for both embodiments that the device has a stop mechanism which limits the screwing-in movement of the blind rivet nut and the spacer. This stop mechanism then prevents the spacer from being tightened too fast to the blind rivet nut when, after the blind rivet nut has been riveted, the threaded stud is screwed out. Otherwise, the tightening of the spacer could later prevent the spacer from being screwed out due to the frictional connection, as intended.

BRIEF DESCRIPTION OF THE DRAWINGS

Embodiment examples of the invention will now be explained in conjunction with the drawings in which.

DETAILED DESCRIPTION

Figure 1:
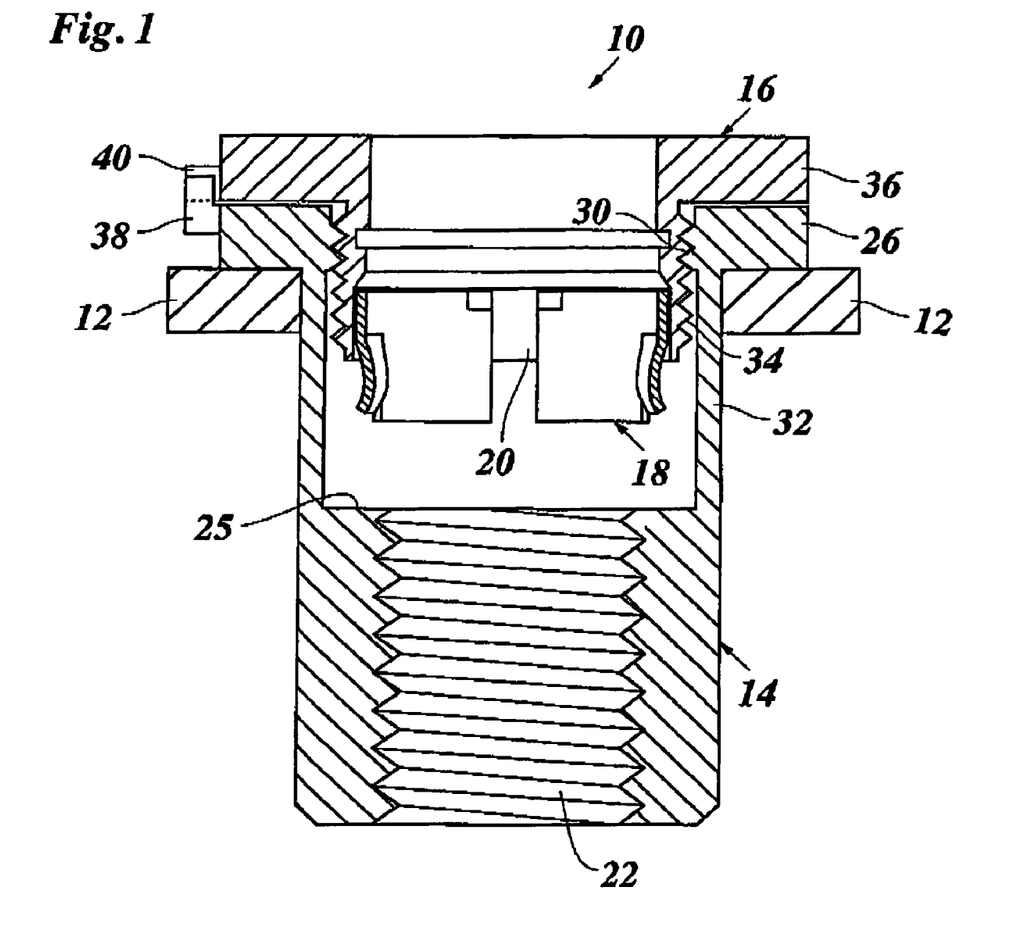
FIG. 1 is a longitudinal sectional view of a first embodiment of a connecting device which has been inserted into a first component part.

FIG. 1 shows a connecting device 10 in a supply condition, inserted in a first component part 12. The connecting device 10 is formed by a blind rivet nut 14 held at the component part 12, a spacer 16 screwed into the blind rivet nut 14, and an intermediate member in the form of an elastic ring 18 that has been inserted in a receptacle 20 on the bottom side of the spacer 16.

The blind rivet nut 14 has in its lower part a right-handed thread 22 for a connecting screw 24 (FIG. 8) the thread being surrounded at its top end by an annular support surface 25 for the elastic ring 18. At the top end, the blind rivet nut 14 engages an outer surface of the component part 12 with a flange 26. A left-handed thread 30 is formed in the top part of the blind rivet nut 14. Below the left-handed thread 30 and the flange 26, a thinner wall 32 forms a deformation portion the function of which will be explained below in conjunction with FIG. 6.

Figure 2:
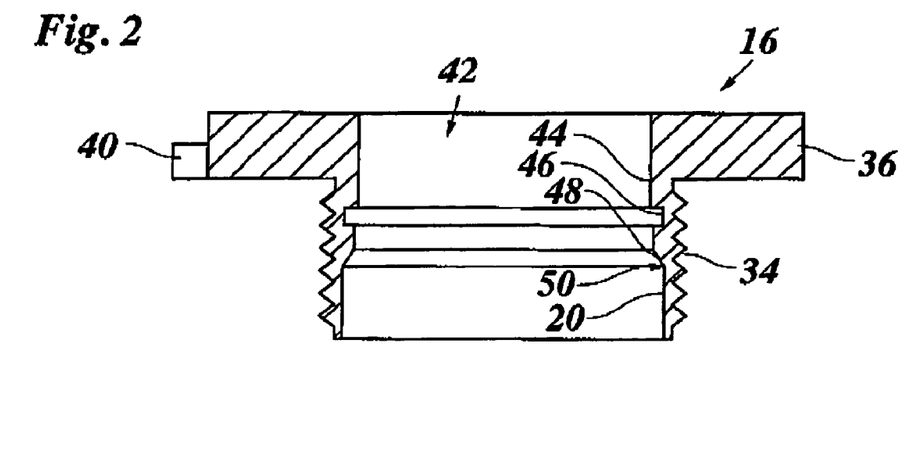
FIG. 2 is a longitudinal sectional view of a spacer of the connecting device.

The spacer 16, which has been shown more clearly in FIG. 2, has an external thread 34 which is a left-handed thread and is in engagement with the left-handed thread 30 of the blind rivet nut 14. The top end of the spacer 16 is provided with a flange 36 which, in the supply condition of the connecting device 10, is slightly spaced apart from the flange 26 of the blind rivet nut 14. The edges of both flanges 26 and 36 are formed with projections 38 and 40 which form a stop mechanism for preventing the spacer 16 from being screwed-in further into the blind rivet nut 14.

A through-bore 42 of the spacer 16 is divided into several sections. A cylindrical top section 44 of the bore 42 merges into the receptacle 20 via a cone 48. An annular groove 46 with a rectangular cross-section is formed in the section 44. In the supply condition of the connecting device 10, the elastic ring 18 is inserted into the receptacle 20 up to the position indicated by an arrow 50, at which the cone 48 begins. The cone 48 forms a guide contour for the elastic ring 18, and the function of this guide contour will be explained below in conjunction with FIG. 6.

Figure 3:
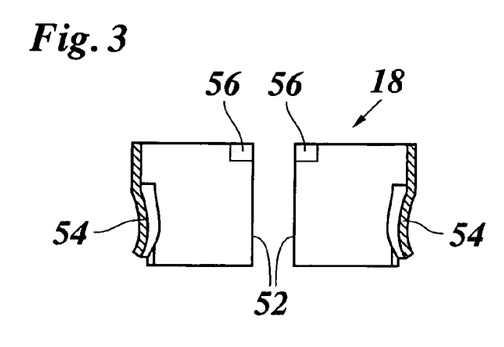
FIG. 3 is a longitudinal sectional view of an elastic ring of the connecting device.
Figure 4:
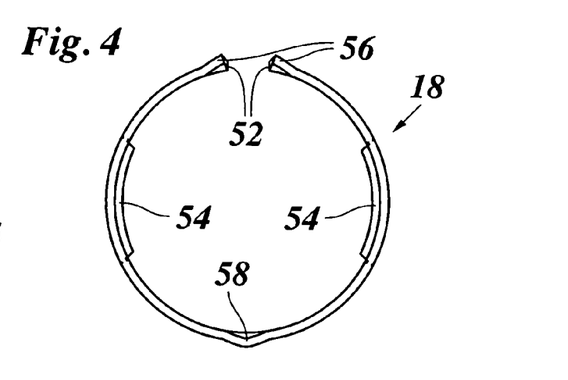
FIG. 4 shows, in a plan view, the elastic ring in the position shown in FIG. 1.

The elastic ring 18 has been shown more clearly in FIGS. 3 and 4. It is formed in one piece from a thin sheet metal. The elastic ring 18 is interrupted by a slot 52 which extends over the entire height of the ring. Two elastic tongues 54 on opposite sides of the elastic ring 18 extend each over the lower two thirds of the height of the ring 18 and each over approximately ⅙ of the circumference. The tongues 54 are bulged inwardly and do not reach completely to the lower edge of the elastic ring 18. At its upper edge, the elastic ring 18 has outwardly projecting snap tongues 56 on the left and right side of the slot 52, and a snap nose 58 diametrically opposite to the snap tongues.

It should be noted that FIGS. 3 and 4 show the elastic ring 18 in an inactive position in the receptacle 20 of the spacer 16, in which position, corresponding to FIG. 1, the ring 18 is clamped in the receptacle 20. This clamping action prevents the elastic ring 18 from falling out.

Figure 5:
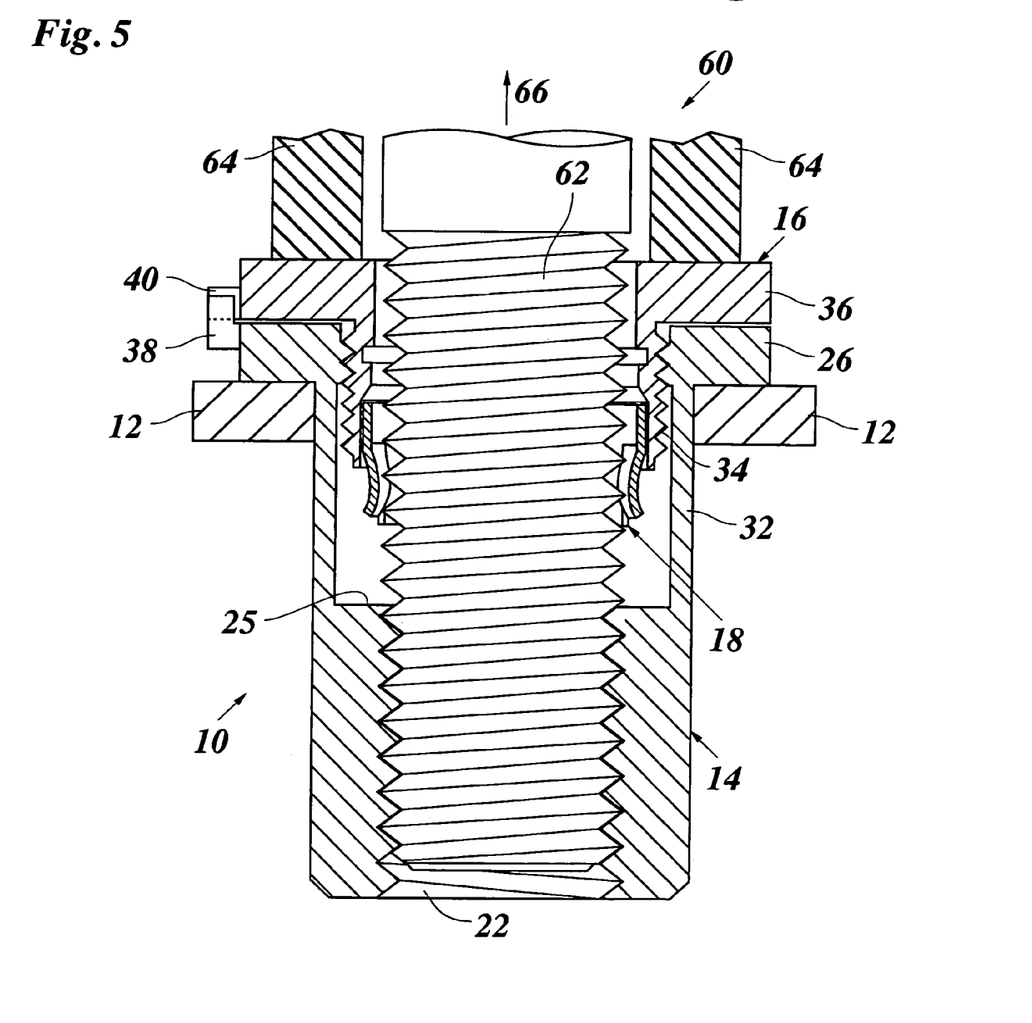
FIG. 5 shows the connecting device together with a riveter.

FIG. 5 illustrates the process of fixing the connecting device 10 at the component part 10 by means of a riveter 60. The riveter 60 has a threaded stud 62 and a sleeve 64. The threaded stud 62 is screwed into the blind rivet nut 14. At that time, it may be inserted with play through the elastic ring 18, which is in its inactive position, and, because of the play, no torque will be transmitted onto the elastic ring 18 when the stud is screwed into the blind rivet nut 14.

The riveter 60 is supported with its sleeve 64 on the top side of connecting device 10. For anchoring the blind rivet nut 14, the threaded stud 62 is withdrawn in direction of an arrow 66, with the result that, by deformation of the thin wall 32, the nut 14 is riveted to and thus anchored in the component part 12.

Figure 6:
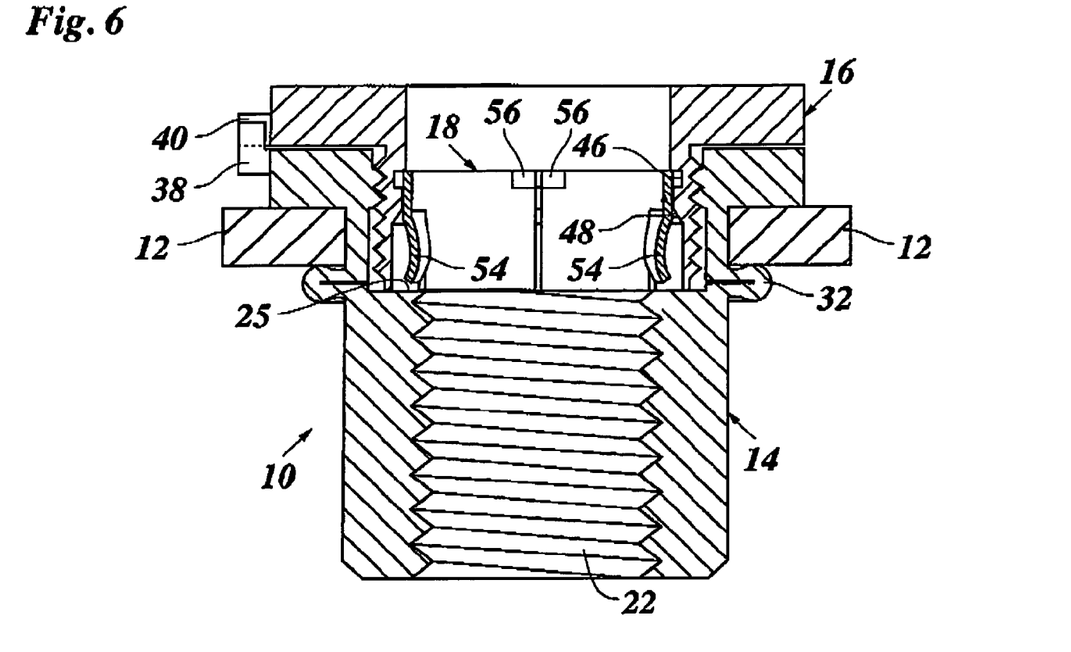
FIG. 6 shows the connecting device with a riveted blind rivet nut.
Figure 7:
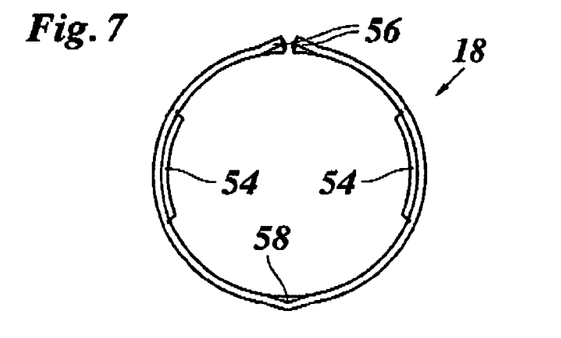
FIG. 7 shows, in a plan view, the elastic ring in the position shown in FIG. 6.

FIG. 6 shows the riveted condition of the connecting device. When the blind rivet nut 14 is jolted by withdrawal of the threaded stud, it abuts with its support surface 25 against the lower edge of the elastic ring 18 and pushes the latter into the cone 48 of the spacer 16, until the ring snaps-in at the annular groove 46 with its snap tongues 56 and the snap nose 58. Simultaneously, the elastic ring 18 becomes narrower, as can be seen more clearly in FIG. 7. In the active position at the elastic ring 18, as shown in FIGS. 6 and 7, the narrowing of the elastic ring has caused the elastic tongues 54 to approach to one another so far that the threaded stud, when being screwed out of the right-handed thread 22 is in frictional contact with the elastic ring 18. Since, however, the projections 38 and 40 prevent the spacer 16 from being screwed further into the blind rivet nut 14, these parts are not rotated relative to one another. This prevents the screw-connection from being tightened too fast.

Figure 8:
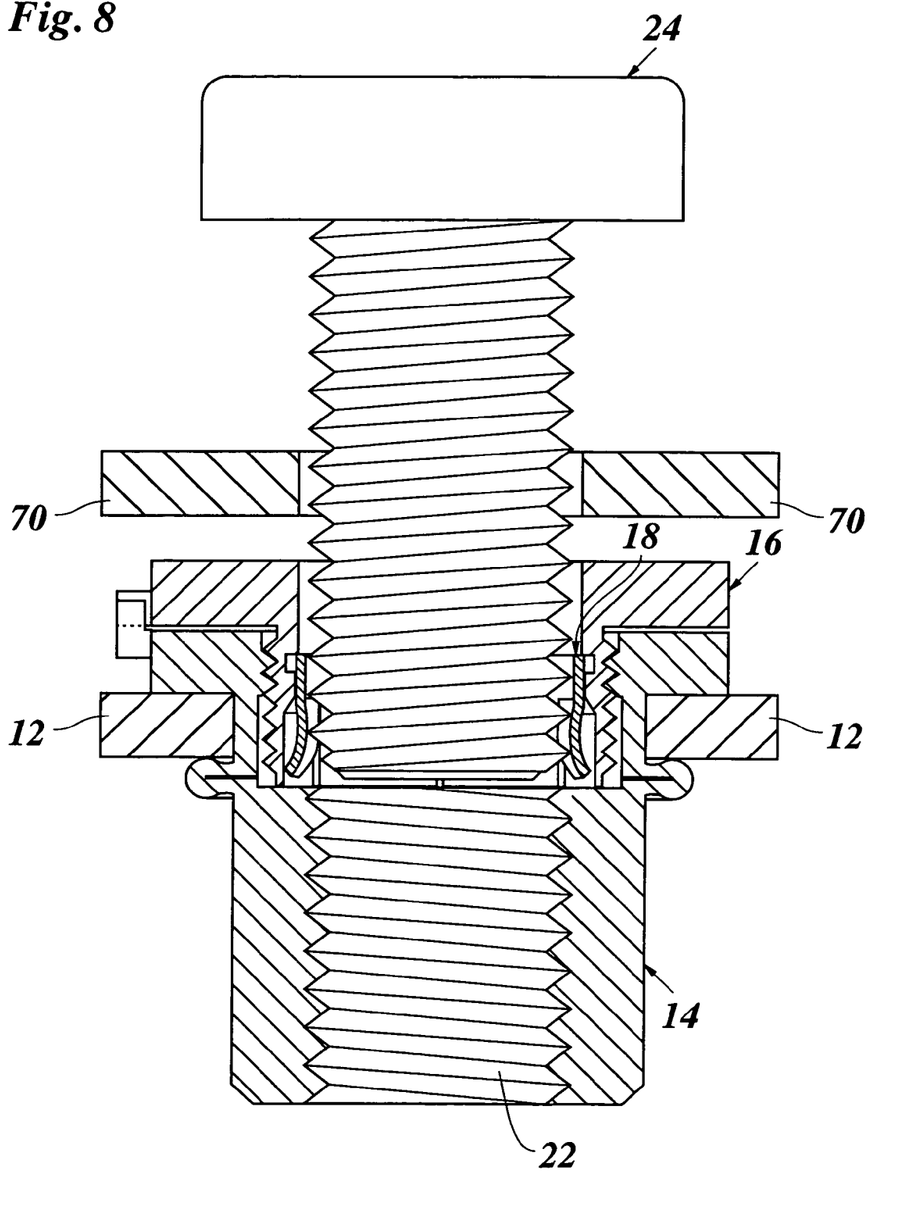
FIG. 8 shows the connecting device of FIG. 6 with an inserted connecting screw passed through a second component part that is to be connected to the first one.

FIG. 8 shows the connecting device of FIG. 7 together with a second component part 70 which is to be connected with the first component part 12. The connecting screw 24 has been inserted through the second component part 70 and into the spacer 16 and is in frictional contact with the spacer 16 via the elastic ring 18, because the elastic tongues 54 press against the connecting screw 24. During insertion of the connecting screw 24, the elastic ring 18 is secured against axial displacement by both the described snap-fastening in the annular groove 46 and the support on the support surface 25.

The connecting screw 24 can now be screwed into the right-handed thread 22 of the blind rivet nut 14, whereby the spacer 16 is entrained clockwise, because of the frictional connection. Since the spacer is in engagement with the blind rivet nut 14 through the left-handed threads 30 and 34, it is screwed out, until its top side abuts against the second component part 70.

Figure 9:
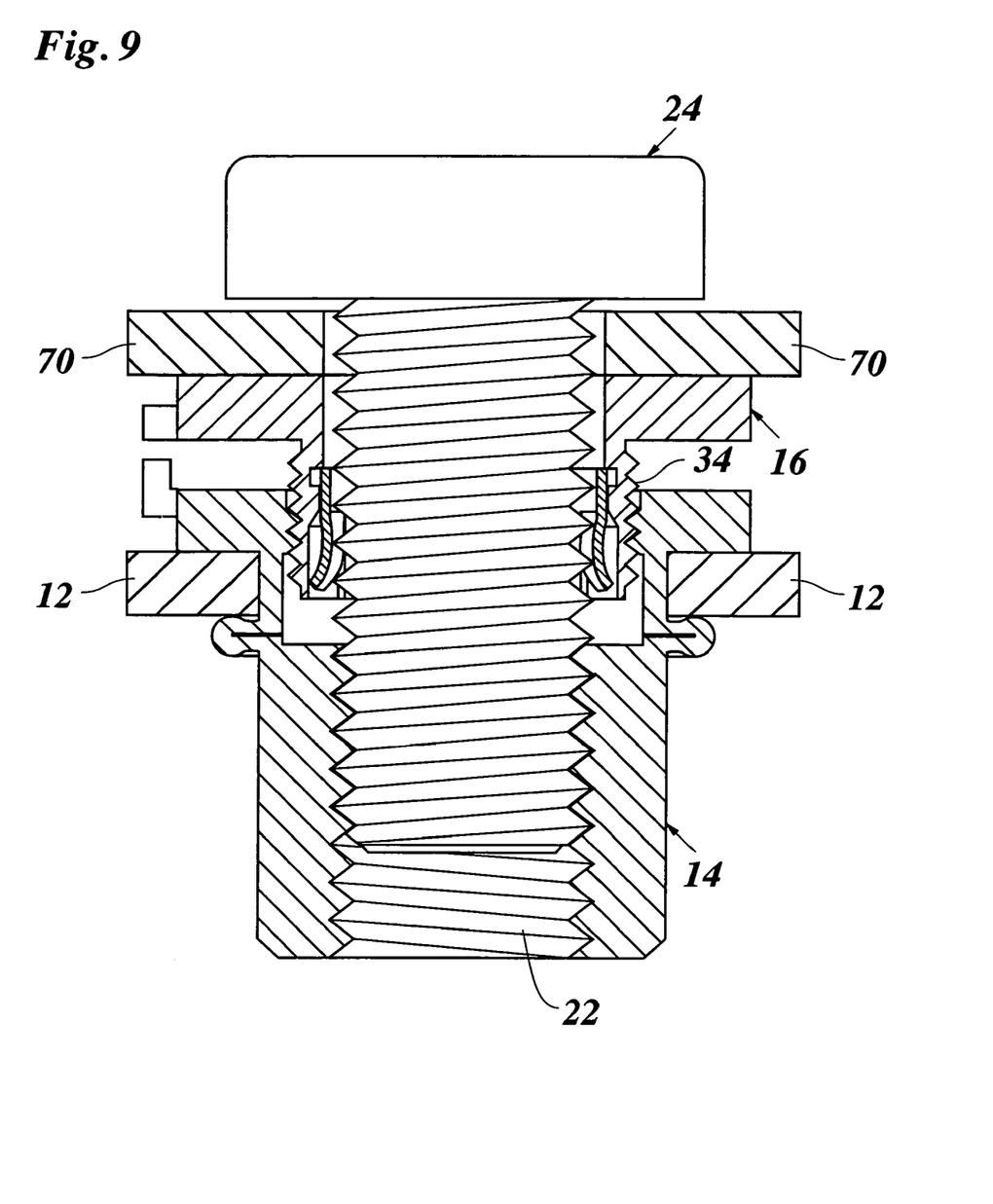
FIG. 9 shows the connecting device of FIG. 8 in a condition in the process of establishing the connection.

This has been shown in FIG. 9. When the connecting screw 24 is screwed-in further, the spacer 16 can no longer be rotated therewith, and the connecting screw 24 slides in the elastic ring 18. In the condition shown in FIG. 9, a slight further rotation of the connecting screw 24 is sufficient for tightening the same and tightening the two component parts 12 and 70 together with a predetermined spacing therebetween.

Figure 10:
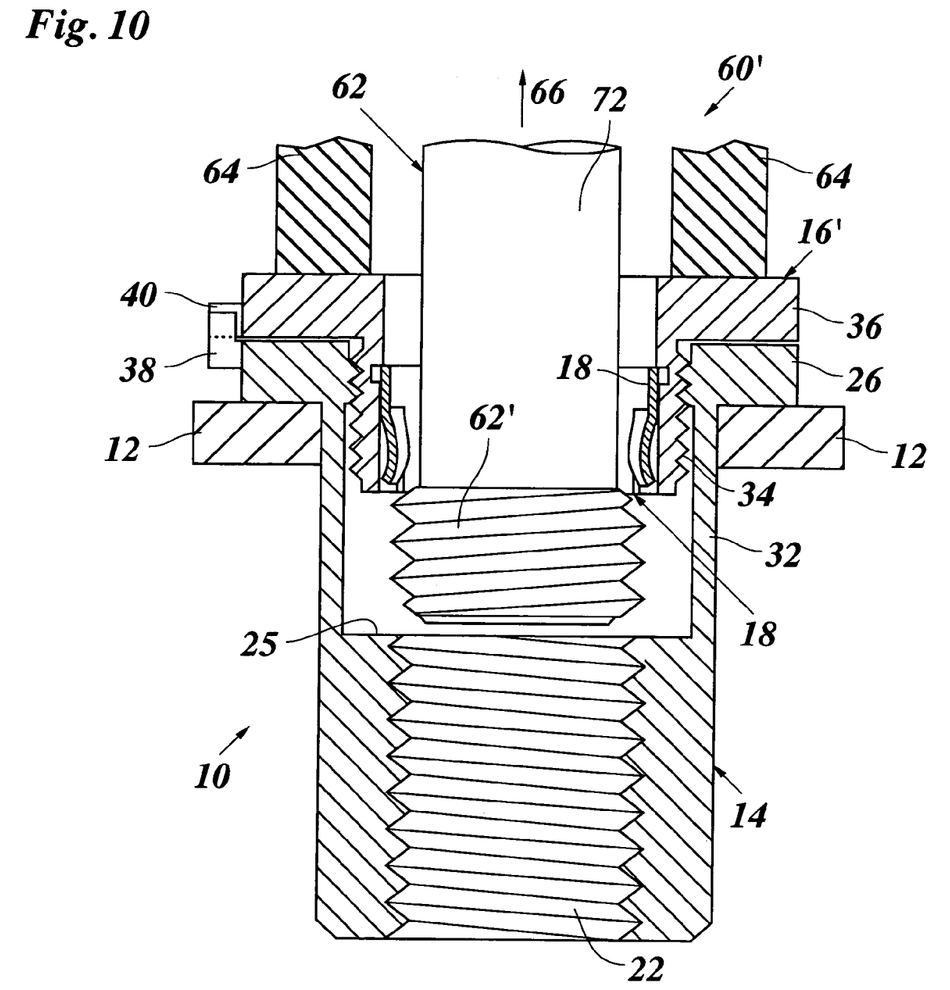
FIG. 10 shows a second embodiment of the connecting device.
Figure 11:
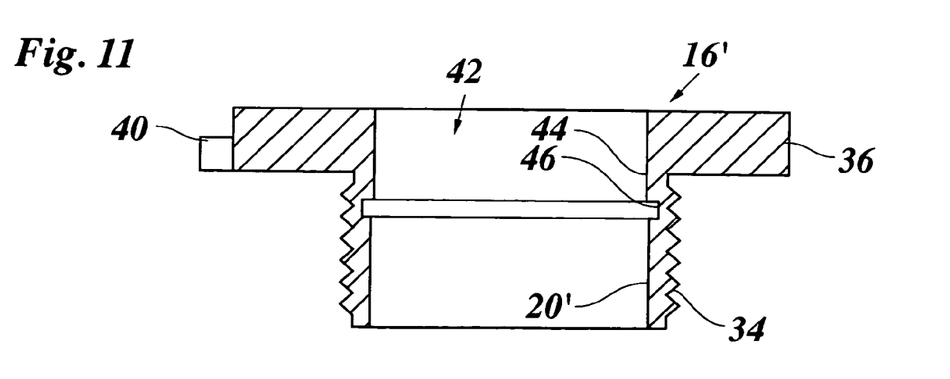
FIG. 11 is a longitudinal sectional view of the spacer in the second embodiment.

FIG. 10 shows a second embodiment which is different from the first embodiment in that the elastic ring 18 is in its active position in a spacer 16' already in the supply condition of the connecting device 10. Consequently, no guide contours are necessary, and the cone 48 of the receptacle 20 may be dispensed with. The receptacle 20' of the spacer 16', which has been shown more clearly in FIG. 11, has an internal diameter which corresponds to the smallest diameter of the cone 48 in FIG. 2, in the whole range below the annular groove 46. The elastic ring 18 is identical with the first embodiment, and its configuration corresponds to the one shown in FIG. 7.

In FIG. 10, for fixing the connecting device 10 at the first component part 12, a threaded portion 62' of the threaded stud 62 of a specifically adapted riveter 60' is pushed through the elastic ring 18. Above the threaded portion 62', the riveter 60' has a shaft 72 the outer diameter of which is smaller than the internal diameter of the elastic ring 18. The height of the threaded portion 62' is adapted to the free height between the elastic ring 18 and the top end of the right-handed thread 22 and is so small that the threaded stud touches the elastic ring 18 only when it is pushed through. Thus, when the threaded stud 62 is subsequently screwed into the blind rivet nut 14, no torque is transmitted onto the elastic ring 18, so that the spacer 16 will not be moved.

When, now, the blind rivet nut 14 is retracted, it is riveted to the component part 12 by deformation of the thin wall 32, as in the first embodiment. However, the elastic ring 18 is not pushed in, because it is in its active position already. The further mounting process, starting with the threaded stud 62 being screwed-out, is the same as in the first embodiment.

The invention claimed is:

1. A device for connecting two component parts, comprising:
   a blind rivet nut adapted to be anchored in one component part;
   a spacer which is in threaded engagement with the blind rivet nut and, by being screwed-out, reaches a position in which it is supported at the other component part;
   a connecting screw adapted to be screwed into the blind rivet nut;
   a torque transmitting intermediate member, which is accommodated in a receptacle of the spacer and transmits a torque onto the spacer when the connecting screw is screwed into the blind rivet nut; and
   a riveter having a threaded stud for anchoring the blind rivet nut in the one component part, the threaded stud and the torque transmitting intermediate member constructed with arranging means that permits the threaded stud of the riveter to be inserted into the intermediate member and the spacer and be screwed into the blind rivet nut without causing the spacer to be rotated in its screw-out direction.

2. The device of claim 1, wherein:
   the threaded stud is adapted to be inserted into the intermediate member, which is in an inactive position, and into the spacer, before the blind rivet nut is anchored in the one component part, and
   the spacer has guide contours which shift the intermediate member into an active position when the blind rivet nut is riveted.

3. The device of claim 2, wherein the intermediate member is an elastic ring which is accommodated in a receptacle of the spacer and which, when the blind rivet nut is riveted, is axially pressed into a cone forming a guide contour of the spacer.

4. The device of claim 3, wherein the elastic ring is interrupted by a slot.

5. The device of claim 2, wherein the intermediate member is locked in its active position against axial displacement in the spacer.

6. The device of claim 2, wherein the blind rivet nut has a support surface for one end of the intermediate member.

7. The device of claim 1, wherein the threaded stud has a threaded portion and a shaft with a smaller diameter, and wherein the height of the threaded portion is sufficiently small that it may be pushed through the intermediate member into a position in which it is located in a height range between the intermediate member and a thread of the blind rivet nut, before the blind rivet nut is riveted to the one component part.

8. The device of claim 7, wherein the intermediate member is an elastic ring.

9. The device of claim 1, further comprising a stop mechanism limiting the screwing-in movement of the spacer into the blind rivet nut.

* * * * *